United States Patent
Aiura et al.

(10) Patent No.: US 6,994,610 B1
(45) Date of Patent: Feb. 7, 2006

(54) METHOD AND APPARATUS FOR POLISHING INNER AN INTERNAL SURFACE OF AN ALUMINUM EXTRUSION HOLLOW SHAPE

(75) Inventors: Tadashi Aiura, Shimonoseki (JP); Katsuhiko Inoue, Shimonoseki (JP); Toshihiko Sasaki, Shimonoseki (JP); Kazuo Akagi, Shimonoseki (JP); Koji Takahashi, Shimonoseki (JP)

(73) Assignee: Nissin Unyu Kogyo Co., Ltd., Yamaguchi-ken (JP)

( * ) Notice: Subject to any disclaimer, the term of this patent is extended or adjusted under 35 U.S.C. 154(b) by 0 days.

(21) Appl. No.: 09/341,339

(22) PCT Filed: Oct. 5, 1998

(86) PCT No.: PCT/JP98/04494

§ 371 (c)(1),
(2), (4) Date: Aug. 30, 1999

(87) PCT Pub. No.: WO99/24206

PCT Pub. Date: May 20, 1999

(30) Foreign Application Priority Data

Nov. 10, 1997 (JP) ................................... 9/325215

(51) Int. Cl.
*B24B 1/00* (2006.01)

(52) U.S. Cl. ........................ 451/51; 451/61; 204/224 M

(58) Field of Classification Search .................. 451/51, 451/61, 56, 465, 470, 467; 204/224 M; 205/73, 205/640, 663
See application file for complete search history.

(56) References Cited

U.S. PATENT DOCUMENTS

| | | | | |
|---|---|---|---|---|
| 2,178,448 A | * | 10/1939 | Indge ........................... | 451/51 |
| 2,764,540 A | * | 9/1956 | Farin et al. .................. | 205/670 |
| 4,601,802 A | * | 7/1986 | Grimes et al. ............... | 204/212 |
| 4,772,367 A | * | 9/1988 | Menzel et al. ............... | 205/653 |
| 5,088,237 A | * | 2/1992 | Nagel et al. .................. | 451/51 |
| 5,800,252 A | * | 9/1998 | Hyatt ........................... | 451/61 |
| 6,029,714 A | * | 2/2000 | Imamura et al. ............. | 138/177 |
| 6,322,424 B1 | * | 11/2001 | Akagi ........................... | 451/51 |

FOREIGN PATENT DOCUMENTS

| | | |
|---|---|---|
| JP | 59-227324 | 12/1984 |
| JP | 62-157722 | 7/1987 |
| JP | 4-13520 | 1/1992 |
| JP | 5-38629 | 2/1993 |

* cited by examiner

*Primary Examiner*—Hadi Shakeri
(74) *Attorney, Agent, or Firm*—Weingarten, Schurgin, Gagnebin & Lebovici LLP

(57) ABSTRACT

There is provided an electrolytic integrated polishing apparatus which enables high precision polishing of the internal surface of a long sized cylindrical workpiece such as a metallic tube. The apparatus includes a work supporting unit 13 for disposing the cylindrical workpiece W, so that the axial center of the cylindrical portion is aligned with the vertical direction, a rotation shaft 4 supported downward along the vertical direction and free-rotatably supported in an external tube 3 which is freely movable along the vertical direction, a tool electrode 5 including a grindstone directed to radial directions, attached to the tip of the rotation shaft 4, and a plastic tube 6 wound around the external surface of the external tube 3 for pressurization.

2 Claims, 4 Drawing Sheets

METHOD AND APPARATUS FOR POLISHING INNER AN INTERNAL SURFACE OF AN ALUMINUM EXTRUSION HOLLOW SHAPE

FIELD OF THE INVENTION

The present invention relates to a polishing method and apparatus for mirror processing of the internal surface of a long sized cylindrical workpiece such as a metallic tube, shape or the like, including an aluminum extrusion hollow shape with a cylindrical portion, using electrolytic integrated polishing technology, and to a long sized cylindrical workpiece such as an aluminum extrusion hollow shape polished by electrolytic integrated polishing according to the method.

BACKGROUND ART

Cylindrical portions of fluid pressure cylinders such as hydraulic cylinders, air cylinders or the like are required to have roundness of 25 $\mu$m for hydraulic cylinders and 150 $\mu$m for air cylinders. For example, because aluminum extrusion hollow shapes used for these cylinders have inadequate precision by normal extrusion only, roundness or dimensional precision of cylindrical portions of most products thereof are improved by machining such as cutting or by post-machining burnishing. However, a material, the cylindrical portion of which has a small bore or a longitudinal size larger than the bore, can not be machined. Therefore, the current situation has been such that, for example, yield is declining for not achieving required roundness, or productivity is staying low for having to machine the pieces, one by one, of a long sized material which must be cut into product length beforehand.

On the other hand, electrolytic integrated polishing technology, a hybrid of elution by electrolyte and abrasion by abrasives, is known as a method for polishing the surface of metal with a high precision. The electrolytic integrated polishing technology, applied to mirror finishing of the internal surface of metallic tubes, generally inserts a rotation shaft, to the top of which a tool electrode is attached, into a metallic tube, rotates the metallic tube about the rotation shaft, then supplies electrolyte inside the metallic tube and passes current, and polishes the internal surface of the metallic tube by a grindstone attached to the tool electrode, withdrawing the rotation shaft slowly.

With such electrolytic integrated polishing methods for the internal surface of metallic tubes, abrasion of the grindstone prevents high precision mirror finishing due to inappropriate polishing of the internal surface. Therefore, apparatuses coping with abrasion of the grindstone by applying pressing force onto the grindstone via a leaf, a diaphragm or the like are conventionally known. (See Japanese Utility Model Laid-Open Publication No. Hei 4-130120, 5-86429 and so on.)

The above mentioned conventional method using a leaf can not preserve the desired polishing performance because pressing force decreases as the grindstone abrades, especially in narrow places such as the internal surface of a long sized metallic tube. Besides, there have been shortcomings such as the necessity of a specific insertion guide for inserting the polishing tool into the metallic tube because the leaf generates force by being bent to a predetermined extent.

On the other hand, although a method using a diaphragm can resolve the above mentioned problem caused by the leaf, a plurality of diaphragms corresponding to a plurality of grindstones must be individually disposed, which makes processing of the installation sections, and installation work complicated. Besides pressing force applied to individual grindstones is not uniform due to variation occurred in the plurality of diaphragms, which makes mirror finishing with a high precision impossible.

The above mentioned method is mainly applied to processing of the internal surface of pipes made from steel or stainless steel. Most apparatuses are horizontal types that can easily perform processing of long sized products, while there are few vertical types. (See Japanese Patent Laid-Open Publication No. Hei 3-98758.) Furthermore, there is no concrete example of application to aluminum extrusion shapes having a variety of external shapes.

Machining (cutting, for example) of the internal surface of the cylindrical portion of an aluminum extrusion hollow shape is more difficult than processing of external surface. Besides, long materials, with difficulties in processing due to problems with rigidity of the tool, must be cut short for processing in order to preserve a certain processing precision. Therefore, other than increase in cost, ultra high precision mirror finishing of aluminum alloy by cutting has been difficult because aluminum alloy, having a low rigidity which is about one-third of steel and a coefficient of thermal expansion twice as large as steel, is easy to be deformed by cutting resistance or cutting heat.

On the other hand, electrolytic integrated polishing which is an ultra high precision finishing technology with a roundness of finished surface equal to or smaller than 10 $\mu$m and a surface roughness equal to or smaller than 1 $\mu$m, can be applied to long sized pipes. However, a problem remains in that directly applying electrolytic integrated polishing methods and apparatuses that have been mainly used for polishing of the internal surface of steel or stainless steel tubes to polishing of the internal surface of a cylindrical portion of an aluminum extrusion hollow shape will not result in processing with a high precision.

For example, the inventors of the present invention failed to obtain the desired processing precision by electrolytic integrated polishing of the internal surface of an aluminum extrusion tube using a conventional electrolytic integrated polishing apparatus (a type in which axial directions of a long sized metallic tube and a tool electrode are horizontally oriented, and the metallic tube and the tool electrode are rotated in opposite directions with each other.) This is because processing needed be performed with the pressing force of the grindstone controlled at a low pressure due to softness and easiness to deformation of aluminum, having a low strength and a low rigidity which are about one-third of steel or stainless steel, and because precision of processing degrades by deflection of the axial center due to influence of weight of the tool electrode supported horizontally by the rotation axis.

Besides, since rotating metallic shapes having a variety of external shapes is virtually impossible, long sized cylindrical workpieces to which the above mentioned electrolytic integrated polishing apparatus can be applied are limited to cylinder pipes.

It is an object of the present invention, having been made considering the above mentioned problems with prior arts, to provide an electrolytic integrated polishing method and apparatus which enables high precision polishing of the internal surfaces of the cylindrical portions of metallic shapes having a variety of external shapes such as aluminum extrusion hollow shapes or the like, and to provide long sized cylindrical workpieces such as aluminum extrusion hollow shapes having internal surfaces of the cylindrical portions polished with a high precision.

DISCLOSURE OF THE INVENTION

The method according to the present invention is an electrolytic integrated polishing method for polishing the internal surface of the cylindrical portion of a long sized cylindrical workpiece such as an aluminum extrusion hollow shape by integrating elution by electrolyte and abrasion by a grindstone attached to a tool electrode inserted into the cylindrical portion, characterized by disposing the long sized cylindrical workpiece so that the axial center of its cylindrical portion is aligned with the vertical direction, inserting the tool electrode attached to the tip of a rotation shaft supported downward similarly along the vertical direction into the cylindrical portion, and rotating as well as relatively moving the tool electrode vertically.

Besides, the apparatus according to the present invention is an electrolytic integrated polishing apparatus for polishing the internal surface of the cylindrical portion of a long sized cylindrical workpiece such as an aluminum extrusion hollow shape by integrating elution by electrolyte and abrasion by a grindstone attached to a tool electrode inserted into the cylindrical portion, characterized by comprising a work supporting unit for disposing the long sized cylindrical workpiece so that the axial center of its cylindrical portion is aligned with the vertical direction, a rotation shaft supported downward along the vertical direction and inserted into the cylindrical portion of the above mentioned long sized cylindrical workpiece, the tool electrode attached to the tip of the rotation shaft, and a transportation unit for moving the above mentioned rotation shaft and/or the work supporting unit along the axial direction.

In the present method and apparatus, because the rotation shaft is supported downward along the vertical direction and the tool electrode is attached to the tip thereof, influence of the weight of the tool electrode and the rotation shaft themselves is eliminated to suppress deflection of the tool electrode, which improves the precision of processing. Besides, the present method and apparatus can be similarly applied to a variety of metallic shapes such as an aluminum extrusion hollow shape having a variety of external shapes, because only the tool electrode is rotated without rotating the long sized cylindrical workpiece.

Here, the above mentioned transportation unit may be disposed at either one of or both sides of the rotation shaft and the work supporting unit. That is, any disposition will do if the long sized cylindrical workpiece and the tool electrode move along the axial direction relatively to each other.

Note that as an embodiment of the above mentioned polishing apparatus, the above mentioned rotation shaft is free-rotatably supported inside an external tube supported downward along the vertical direction. The external tube does not rotate, preferably covers almost throughout the whole length of the rotation shaft except for the tool electrode at the tip thereof, and is moved along the axial direction simultaneously with the rotation axis. In this case, since the rotation shaft is free-rotatably supported at the center of the external tube, deflection of the tool electrode when rapidly rotating is suppressed to improve the precision of processing.

Besides, when the above external tube is provided, it is preferable to wind a plastic tube spirally around the peripheral thereof and to enable pressurization inside the plastic tube. When the external tube is inserted, for example, into the cylindrical portion of a long sized cylindrical workpiece, such as an aluminum extrusion hollow shape, and pressure is applied onto the plastic tube at the state, the plastic tube expands and is pressed against the internal surface of the cylindrical portion. The effect, preventing minute deflections caused by rotation of the rotation axis and the tool electrode and maintaining the external tube always at the center of the cylindrical portion, results in further improvement of the precision of processing.

Furthermore, preferably a hollow portion is provided inside the tool electrode, a pressure tube composed of silicon tube or the like, inside of which can be pressurized, is provided in the above mentioned hollow portion. By pressurizing inside the pressure tube, elastic grindstones can be pressed with a constant pressure toward radial directions. Besides, a constant pressing force is always maintained when the grindstones are worn out.

Moreover, by the electrolytic integrating polishing method and apparatus, it becomes possible to perform finish polishing, without machining, of a long sized metallic shape such as an aluminum extrusion hollow shape, the length of the cylindrical portion of which is ten times as large as the diameter, or more, with a roundness of the internal surface of the cylindrical portion equal to or smaller than 10 $\mu$m and a surface roughness Rmax along the axial and circular directions equal to or smaller than 1 $\mu$m.

Other characteristics of the present invention will be described in detail in the following sections about preferred embodiments of the invention.

BEST MODE FOR CARRYING OUT THE INVENTION

The electrolytic integrated polishing apparatus according to the present invention will be described in detail hereinafter with reference to FIGS. 1 to 5.

Figure 1:
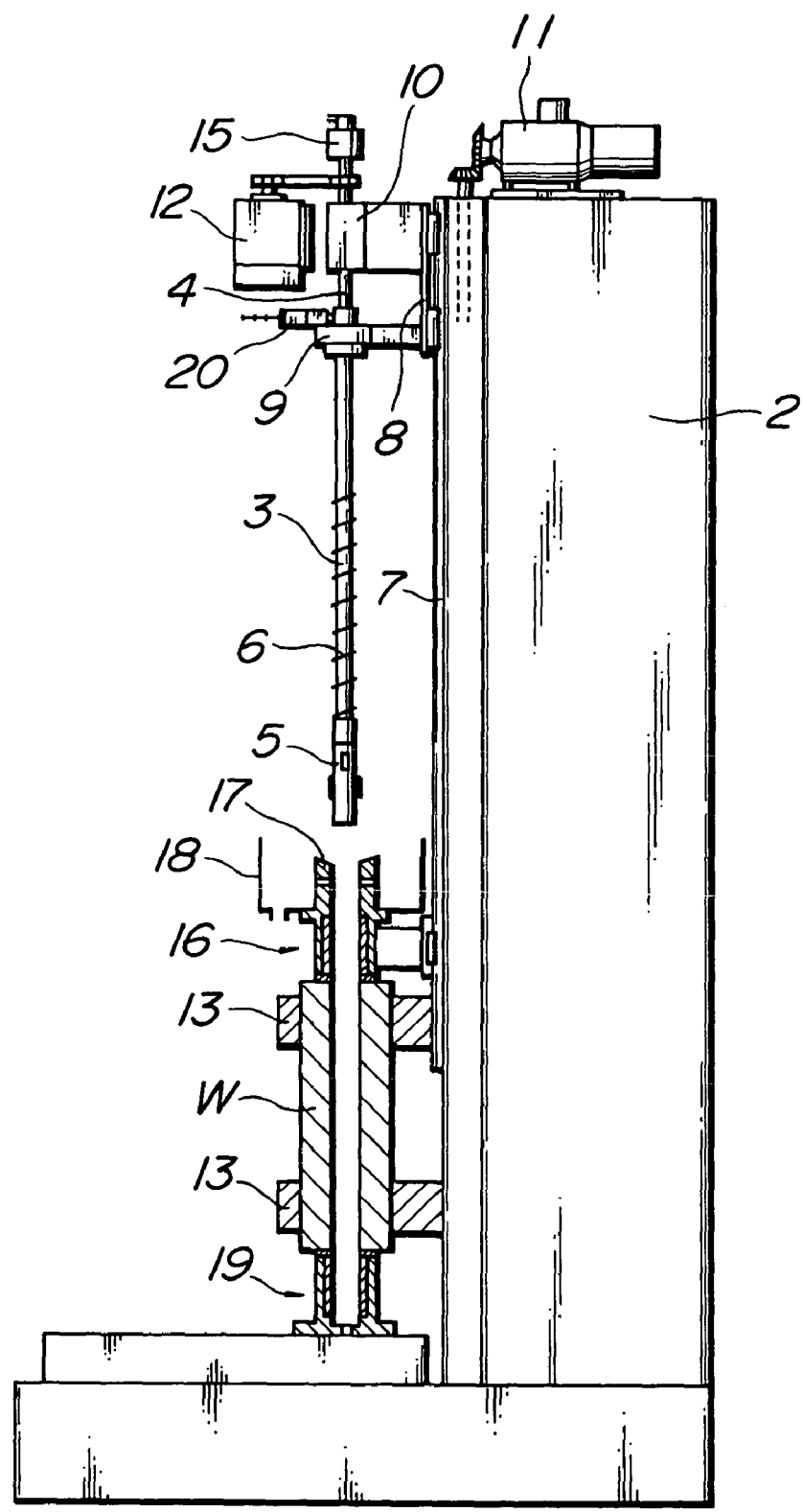
FIG. 1 is a general view of an electrolytic integrated polishing apparatus according to the present invention.
Figure 2:
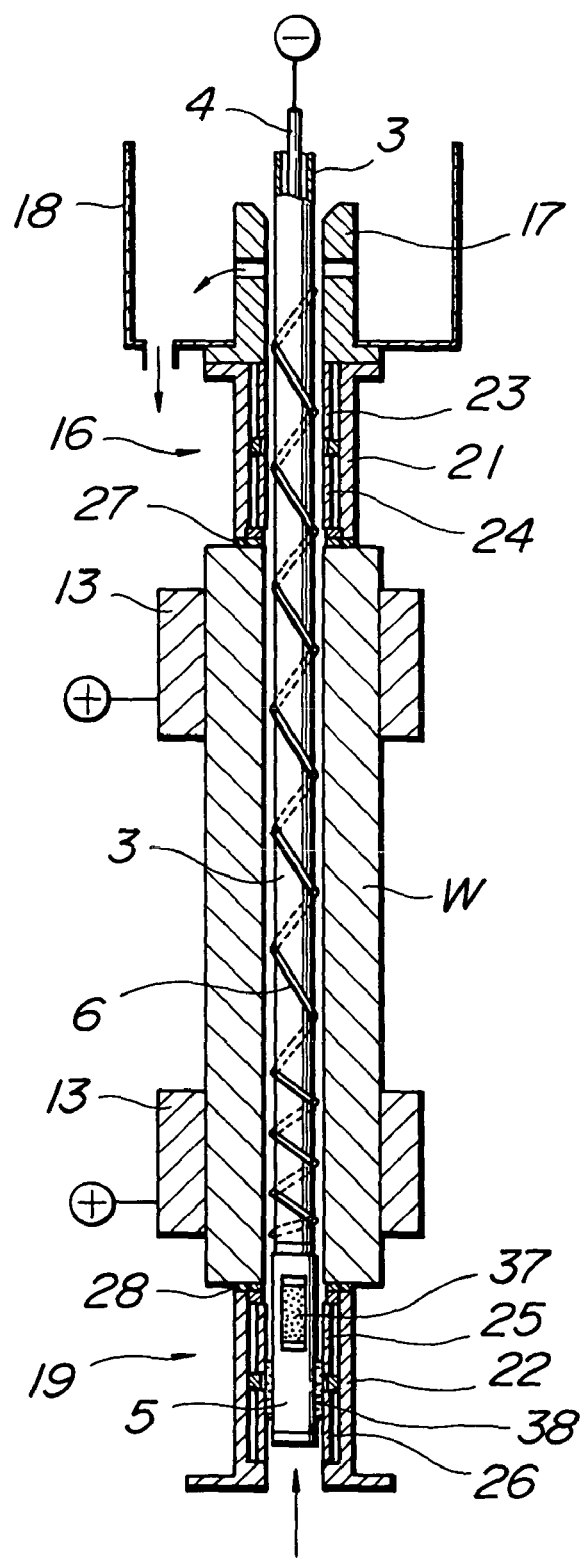
FIG. 2 is a view illustrating the major portion thereof.

As shown in FIGS. 1 and 2, the electrolytic integrated polishing apparatus includes a platform 1, a frame 2 disposed on the platform, an external tube 3 vertically disposed, a rotation shaft 4 vertically and free-rotatably disposed via a plurality of bearings (not shown) inside the external tube 3, a tool electrode 5 attached to the tip of the rotation shaft 4 at the lower portion of the external tube 3, a plastic tube 6, inside of which can be pressurized by a mechanism (not shown), comprising a silicon tube or the like and being spirally wound around the peripheral of the external tube 3, a guide 7 attached to the frame 2, a sliding member 8 freely and vertically slidable along the guide 7, a supporting member 9 fixed to the sliding member 8 for supporting the upper end of the external tube 3, a bearing member 10 fixed to the sliding member 8 for supporting nearby the upper portion of the rotation shaft 4, a transportation motor 11 for sliding the sliding member 8 vertically along the guide 7 thus moving the external tube 3 and the rotation shaft 4 upward and downward, a motor 12 attached to the sliding member 8 for rotating the rotation shaft 4, and a fixed chuck 13 (positive pole energizing chuck) for fixing a long sized cylindrical workpiece, such as, for example, an aluminum extrusion hollow shape W.

In the electrolytic integrated polishing apparatus, the rotation shaft 4 is a hollow shaft (see FIG. 3) the top of which enabling introduction of air into a hollow bore 4a via a rotary joint 15. Besides, the present apparatus also includes a free ring mechanism 16, which is located above the fixed chuck 13, freely slidable along the guide 7 and can be fixed to any appropriate position, a guide sleeve 17 disposed on the free ring mechanism 16, a liquid receiver 18 for receiving electrolyte flowing out from an opening of the guide sleeve 17, a free ring mechanism 19 fixed at a lower position of the fixed chuck 13, and a negative pole energizing brush 20 contacting the rotation shaft 4.

The free ring mechanisms 16 and 19 have approximately the same structure, wherein free rings 23, 24, 25 and 26 are free-rotatably supported, in two layers within fixed sleeves 21 and 22, independent of each other, via a mechanical seal. Then, the free ring mechanisms 16 and 19 are kept in contact, via seal packings 27 and 28 with the upper and the lower openings of the cylindrical portion of the aluminum extrusion hollow shape W attached to the fixed chuck 13. The free rings 23 to 26 have the same or slightly larger bore than the finished bore of the cylindrical portion of the aluminum extrusion hollow shape W, and approximately the same length as that of an elastic grindstone, described hereafter, of the tool electrode 5. The free rings 23 to 26 are rotated freely and synchronously by the pressing force of the elastic grindstone, and prevent the end surface of the cylindrical portion of the aluminum extrusion hollow shape W from deforming into a bell-mouth shape because of the polishing.

Besides, the guide sleeve 17, successively disposed on the free ring mechanism 16, has approximately the same bore as those of the free rings 23 and 24.

Figure 3:
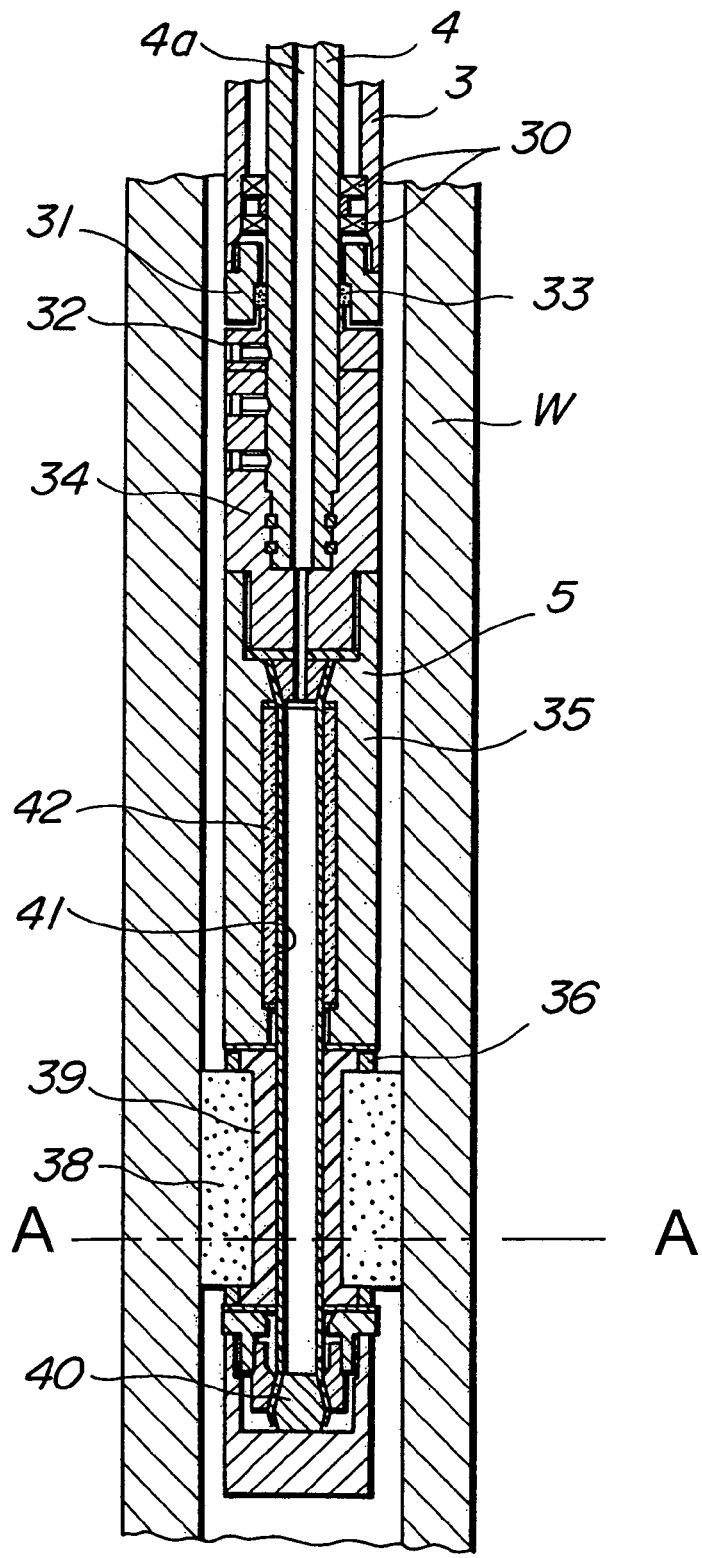
FIG. 3 is a vertical cross sectional view of the tool electrode.

As shown in FIG. 3, the rotation shaft 4 is free-rotatably supported in the external tube 3 by bearing 30. Besides, a felt-like seal 33 intermediates between a seal holder 31 screwed into the lower end of the external tube 3 and a seal holder 32 fixed to the rotation shaft 4 to prevent electrolyte from flowing in between the external tube 3 and the rotation shaft 4 which are rotating relatively to each other.

Figure 4:
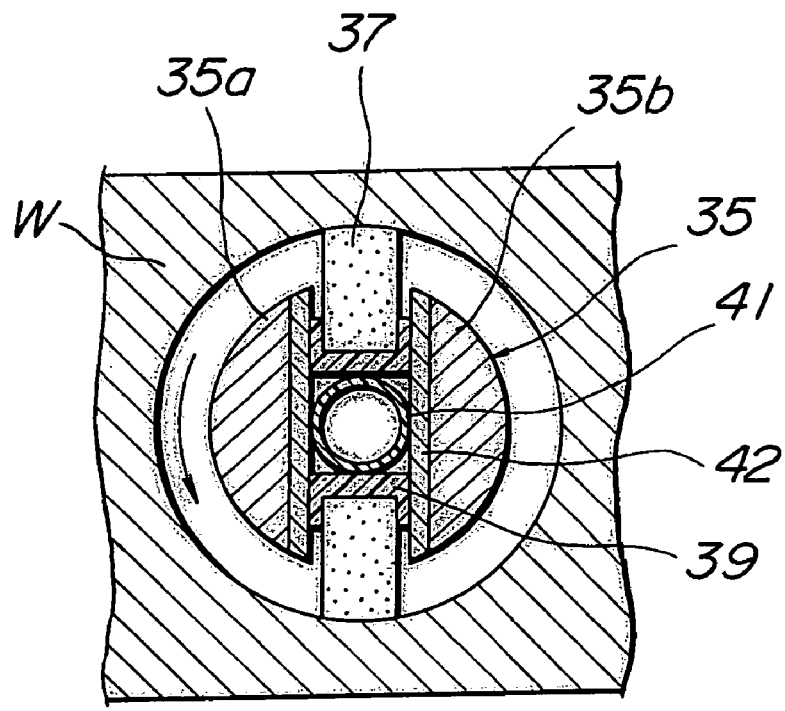
FIG. 4 is a horizontal cross sectional view of the electrode at A—A plane in FIG. 3.

The tool electrode 5 is attached, via a mounting member 34, to the tip of the rotation shaft 4 projecting from the lower end of the external tube 3. As also shown in FIG. 4, hollow electrodes 35 and 36 are attached to the upper and the lower sections of the tool electrode 5, apart from each other by a predetermined interval. Openings are provided to each of the electrodes 35 and 36, in a radial manner, 180 degrees apart from each other. The openings of each of the electrodes 35 and 36 are faced to directions 90 degrees apart. In each opening, as abrasives, elastic grindstones 37 and 38 for coarse polishing and finishing, respectively, are supported as well as a holder 39 along radial directions to be freely slidable. Disposed in the hollow of the tool electrode 5 is a pressure tube 41, composed of a silicon tube or the like, one end of which communicates with the hollow bore 4a of the rotation shaft 4 while the other end thereof is sealed by a plug 40. The pressure tube 41 expands by air introduced into the hollow bore 4a via the rotary joint 15, and presses the elastic grindstones 37 and 38, toward radial directions, against the internal surface of the cylindrical portion of the aluminum extrusion hollow shape W with a constant pressure according to the air pressure. A hard glass 31 is attached to the side walls of the openings of the electrodes 35 and 36 to reduce the friction between the electrodes and the holder 39.

In order to prevent leakage current, insulation is provided between the supporting member 9 and the external tube 3 and between the bearing member 10 and the rotation shaft 4, and the external surface of the external tube 3 is insulated by sheathing. Besides, the metallic portions of the tool electrode 5 are insulated by sheathing except that the sides of the external surface of the electrode 35 sandwiching the elastic grindstone 37 are exposed. As for the exposed surface, the front side of the direction of rotation of the elastic grindstone 37 is an exposed surface 35a for passivation coating generation, and the rear side thereof is an exposed surface 35b for intensive elution.

The plastic tube 6 wound around the external tube 3 is, as shown in FIG. 2, located between the external surface of the external tube 3 and the internal surface of the cylindrical portion of the aluminum extrusion hollow shape W, the free rings 23 and 24, and the guide sleeve 17, respectively. Applying pressure inside of the plastic tube 6 expands and presses the plastic tube 6 against the internal surface of the above mentioned elements, which prevents minute deflections of the external tube 3 caused by rapid rotation of the rotation shaft 4 and the tool electrode 5.

The polishing process using the electrolytic integrated polishing apparatus will be described next.

Firstly, the aluminum extrusion hollow shape W to be processed is grasped by the fixed chuck 13 and fixed on the free ring mechanism 19 via the seal packing 28, and the free ring mechanism 16 is fixed on the aluminum extrusion hollow shape W via the seal packing 27. Here, the axial center of the internal surfaces of the cylindrical portion of the aluminum extrusion hollow shape W, each of the free rings 23 to 26 and the guide sleeve 17 must be aligned on the same axial line, and, at the same time, they must be aligned on the same axial line of the external tube 3, the rotation shaft 4 and the tool electrode 5. (see FIG. 1).

Under this situation the transportation motor 11 is driven to bring down the sliding member 8 and to insert the tool electrode 5 from the guide sleeve 17. Thus the bringing down is stopped at a position shown in FIG. 2, that is, a position where the elastic grindstone 37 for coarse polishing meets the lower position, for example, being the location of the free ring mechanism 19, of the cylindrical portion of the aluminum extrusion hollow shape W. Because no air is introduced into the pressure tube 41 and the inside of the plastic tube 6 is not pressurized, the tool electrode 5 and the external tube 3 can be smoothly inserted without resistance.

Next, air is introduced into the plastic tube 6 and the pressure tube 41 for pressurization, and electrolyte is introduced from the electrolyte injection opening at the lower portion of the free ring mechanism 19. Then the motor 12 is driven to rapidly rotate the rotation shaft 4 and the tool electrode 5. The rotation shaft 4 and the fixed chuck 13 are energized, setting the electrodes 35 and 36 to be the negative pole and the aluminum extrusion hollow shape W to be the positive pole and driving the transportation motor 11 to bring up the tool electrode 5 at a constant velocity.

Now, the electrolyte rises through the gap between the tool electrode 5 and the internal surfaces of the free rings 25 and 26, and passes through the gap between the internal surface of the cylindrical portion of the aluminum extrusion hollow shape W and the external surface of the external tube 3, the gap between the internal surface of the free rings 24 and 23 and the external surface of the external tube 3, and the gap between the internal surface of the guide sleeve 17 and the external surface of the external tube 3. Then the electrolyte is discharged to the liquid receiver 18, recovered and, after having the polishing sludge separated by precipitation and filtered, forcedly fed again to the electrolyte injection opening.

At the beginning of the polishing process, the elastic grindstones 37 and 38 are pressed against the internal surfaces of the free rings 25 and 26, however the free rings 25 and 26 will not be polished because they are rotating in synchronization with the rotation of the elastic grindstones 37 and 38. Here, by disposing the free rings 25 and 26 in two layers with approximately the same length as the elastic grindstones 37 and 38, inertia weight of each becomes small, which results in better response to the rotation of the elastic grindstones 37 and 38.

As the tool electrode 5 rises and the elastic grindstone 37 comes into the cylindrical portion of the aluminum extrusion hollow shape W, the elastic grindstone 37 is pressed against its internal surface and polishing is performed based on the following principle. That is, while the electrode 35 is rapidly rotating, a thin passivation coating is generated on the internal surface of the cylindrical portion via the exposed surface 35a for passivation coating generation before the elastic grindstone 37 begins polishing. Then the elastic grindstone 37 abrades the internal surface of the cylindrical portion, results in removing the passivation coating which lacks viscosity and exposing the metallic base. Immediately after that, electrolytic current concentrates on the height of the metallic base via the exposed surface 35b for intensive elution and performs selective electrolysis. Following the above, the tool electrode 5 gradually rises and the electrolytic integrated polishing is performed on the internal surface of the cylindrical portion until the elastic grindstones 37 and 38 are withdrawn from the cylindrical portion of the aluminum extrusion hollow shape W, smoothing the internal surface.

At the initial stage of the polishing process, the free rings 25 and 26 prevent the end surface of the cylindrical portion of the aluminum extrusion hollow shape W from being polished into a bell-mouth shape. That is, with regard to the elastic grindstone 37 for example, on its way entering the cylindrical portion, a portion of the elastic grindstone 37 is pressed against the internal surface of the cylindrical portion while the rest of the portions thereof are pressed against the free ring 25. However, because the bores of the cylindrical portion and the free ring 25 are the same, the pressed surface of the elastic grindstone 37 being pressed does not tilt, therefore the end surface of the cylindrical portion will not be polished into a bell-mouth shape.

When the elastic grindstones 37 or 38 are being withdrawn from the cylindrical portion of the aluminum extrusion hollow shape W at the final stage of the polishing process, the free ring 24 prevent the end surface of the cylindrical portion from being polished into a bell-mouth shape.

While the polishing process is being performed, the plastic tube 6 is pressurized and pressed against the internal surfaces of the cylindrical portion of the aluminum extrusion hollow shape W, the free rings 23 and 24, and the guide sleeve 17, respectively preventing minute deflections of the external tube 3 caused by rapid rotation of the rotation shaft 4 and the tool electrode 5, which eventually prevents deflection of the tool electrode 5 in the cylindrical portion. By disposing the guide sleeve 17 with a constant length successively above the free ring mechanism 16, the plastic tube 6 can provide a contacting internal surface until the elastic grindstones 37 and 38 are completely withdrawn from the cylindrical portion of the aluminum extrusion hollow shape W and stopped rotating, which can prevent deflection of the external tube 3.

Here, metallic tubes or shapes made from steel, stainless steel, aluminum, aluminum alloy or the like may be exemplified, although not limited to them, for the long sized cylindrical workpiece to which the method according to the present invention is applied. Besides, the length of the cylindrical portion is ten times as large as the diameter, or more. The long sized cylindrical workpiece is finished to have a roundness of the internal surface of the cylindrical portion thereof equal to or smaller than 10 $\mu$m and a surface roughness Rmax equal to or smaller than 1 $\mu$m, by the electrolytic integrated polishing.

EXAMPLE 1

Figure 5:
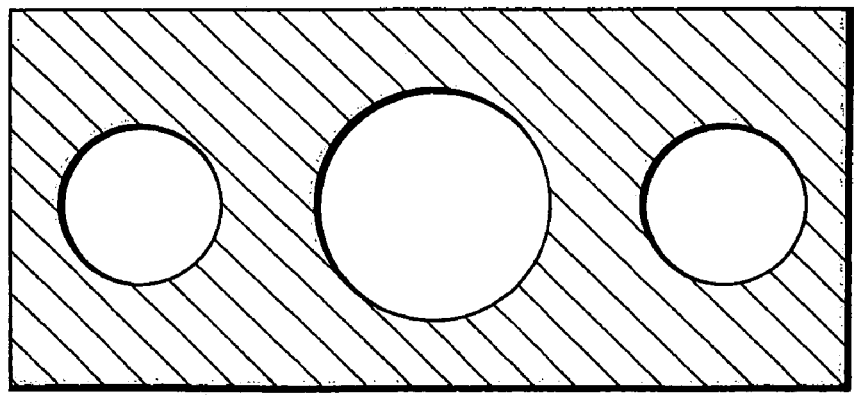
FIG. 5 is a cross sectional view of an aluminum extrusion hollow shape used in the example.

A 600 mm long aluminum extrusion hollow shape, having a cross section shown in FIG. 5 was disposed in a vertical type electrolytic integrated polishing apparatus shown in FIG. 1 for polishing its central cylindrical portion (32 mm of finishing bore). Polishing was performed with the tool electrode having two-layered electrodes and elastic grindstones for coarse polishing and finishing, and under a condition that the electrolyte was sodium nitrate aqueous solution (20%), applied voltage was 8 V, rotation speed of the tool electrode was 2.5 m, rising speed was 1 m per minute.

As a result, roundness of the shape at the central cylindrical portion, which was 450 $\mu$m before polishing, became 9.2 $\mu$m after polishing, surface roughness (Rmax) along axial direction, which was 0.8 $\mu$m before polishing, became 0.5 $\mu$m after polishing, and surface roughness (Rmax) along circular direction, which was 1.98 $\mu$m before polishing, became 0.3 $\mu$m after polishing, all of which showed a largely improved precision.

EXAMPLE 2

A 600 mm long stainless steel cold-finished tube was disposed in a vertical type electrolytic integrated polishing apparatus shown in FIG. 1 for polishing its internal surface (32 mm of finishing bore). Polishing was performed with the tool electrode having two-layered electrodes and elastic grindstones for coarse polishing and finishing, and under a condition that the electrolyte was sodium nitrate aqueous solution (20%), applied voltage was 8 V, rotation speed of the tool electrode was 3.0 m, rising speed was 0.4 m per minute.

As a result, surface roughness (Rmax) of the base tube, which was 10 $\mu$m before polishing, became after finishing, 0.2 $\mu$m with a grain size #1500 and 0.08 $\mu$m with a grain size #6000, all of which provided an excellent mirror finishing.

APPLICABILITY TO INDUSTRY

According to the present invention, polishing of the internal surface of the cylindrical portion of a long sized cylindrical workpiece with a high precision in terms of roundness and surface roughness becomes possible, without machining. Therefore, for example, a process, wherein a workpiece still in the form of a long sized material is polished and afterwards cut into pieces with a length of a fluid pressure cylinder, can be performed, improving the efficiency of the high-precision polishing and the productivity. Additionally, the present invention can be applied to high-precision polishing of the internal surfaces of the cylindrical portions of metallic shapes having a variety of external shapes.

What is claimed is:

1. An electrolytic integrated polishing apparatus for polishing the internal surface of the cylindrical portion of an aluminum extrusion hollow shape by integrating elution by electrolyte and abrasion by a grindstone attached to a tool electrode inserted into an inside of the cylindrical portion, said apparatus comprising a work supporting unit for disposing the aluminum extrusion hollow shape so that an axial center of the cylindrical portion is aligned with a vertical direction, a rotation shaft supported downward along the vertical direction and inserted into the inside of the cylindrical portion of said aluminum extrusion hollow shape, a tool electrode attached to a tip of the rotation shaft, and a transportation unit for moving said rotation shaft and/or the work supporting unit along the axial direction; and wherein a free ring mechanism is disposed at and axially aligned with one or more of an upper and lower openings of the cylindrical portion of the aluminum extrusion hollow shape, said free ring mechanism has a sleeve and a free ring supported free-rotatably within the sleeve, and has approximately the same bore as a finished bore of said cylindrical portion and has approximately the same length as that of an elastic grindstone, and is rotatable freely and synchronously by a pressing force of the elastic grindstone.

2. The apparatus for polishing the internal surface of the cylindrical portion of an aluminum extrusion hollow shape according to claim 1, further comprising a hollow portion inside the tool electrode, and a pressure tube, which can be pressurized, in said hollow portion.

* * * * *